(12) United States Patent  
Regnier

(10) Patent No.: US 7,776,117 B2
(45) Date of Patent: Aug. 17, 2010

(54) AIR FILTRATION UNITS OF THE TYPE COMPRISING FILTRATION BAGS

(75) Inventor: Philippe Regnier, Pont de Roide (FR)

(73) Assignee: Dantherm Filtration SAS, Pont-de-Roide (FR)

( * ) Notice: Subject to any disclaimer, the term of this patent is extended or adjusted under 35 U.S.C. 154(b) by 1082 days.

(21) Appl. No.: 10/563,053

(22) PCT Filed: Jun. 30, 2004

(86) PCT No.: PCT/FR2004/050301

§ 371 (c)(1),
(2), (4) Date: May 1, 2006

(87) PCT Pub. No.: WO2005/005021

PCT Pub. Date: Jan. 20, 2005

(65) Prior Publication Data

US 2006/0201117 A1 Sep. 14, 2006

(30) Foreign Application Priority Data

Jul. 4, 2003 (FR) .................................. 03 08217

(51) Int. Cl.
*B01D 46/02* (2006.01)
(52) U.S. Cl. ............................... 55/378; 55/480; 55/493
(58) Field of Classification Search ........... 55/376–379, 55/302, 283, 490, 493, 521, 341.1, DIG. 5, 55/480; 95/278–280; 92/130 D; 177/246; 248/95, 325, 575; 267/74, 173, 177, 178
See application file for complete search history.

(56) References Cited

U.S. PATENT DOCUMENTS 2,981,368 A * 4/1961 Johnson ........................ 55/379
4,003,727 A 1/1977 O'Dell
4,056,374 A 11/1977 Hixenbaugh
4,244,718 A * 1/1981 Noddin ......................... 55/377
4,266,956 A * 5/1981 Revell .......................... 55/478
4,339,251 A 7/1982 Shumate
4,813,985 A 3/1989 Brennecke et al.

(Continued)

FOREIGN PATENT DOCUMENTS

DE 345 918 12/1921

(Continued)

*Primary Examiner*—Duane Smith
*Assistant Examiner*—Minh-Chau T Pham
(74) *Attorney, Agent, or Firm*—Young & Thompson

(57) ABSTRACT

An air filtration unit, includes a filter cartridge (4) of the filtration bag (6) type, the bags (6) being arranged vertically and held extended by appropriate fixing elements (16, 17), between two support structures (12, 13). The upper ends (15) of the bags (6) are fixed to an upper support structure (13), in the form of a perforated sheet and the lower ends thereof (14) are fixed to a lower support structure (12), in the form of a grille. According to the invention, the fixing elements (16, 17), for the filtration bags (6), are embodied to permit the tensioning of the bags (6) at the upper end (15) thereof. The invention further relates to a particular method for assembly of a filtration bag within a unit as above, a tool for tensioning bags, embodied to be suitable for the unit.

9 Claims, 6 Drawing Sheets

U.S. PATENT DOCUMENTS 5,061,303 A    10/1991  Williams et al.
5,961,696 A *  10/1999  Gombos ..................... 95/273
6,613,115 B2 *  9/2003  Moore ........................ 55/302
6,676,722 B1 *  1/2004  Clements et al. ............. 55/378

FOREIGN PATENT DOCUMENTS

| | | |
|---|---|---|
| EP | 0 529 225 | 3/1993 |
| FR | 1 374 945 | 10/1964 |
| GB | 485 039 | 5/1938 |
| GB | 1 532 302 | 11/1978 |
| WO | WO 98/36819 | 8/1998 |

\* cited by examiner

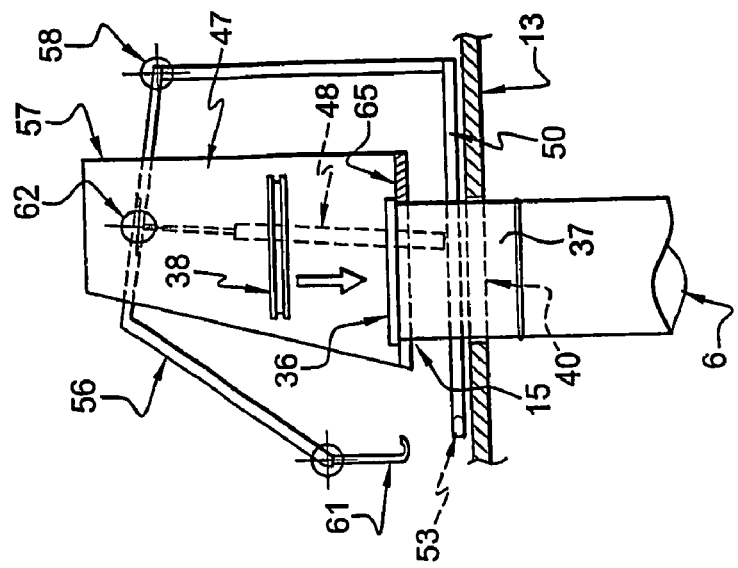
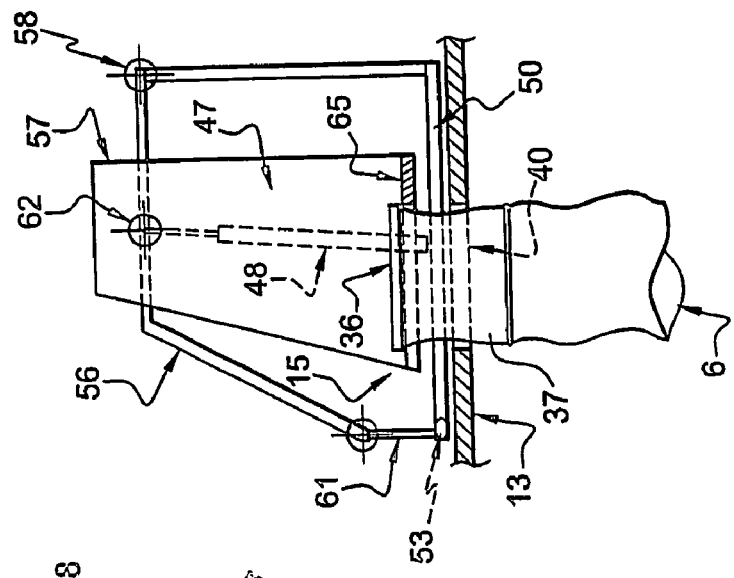
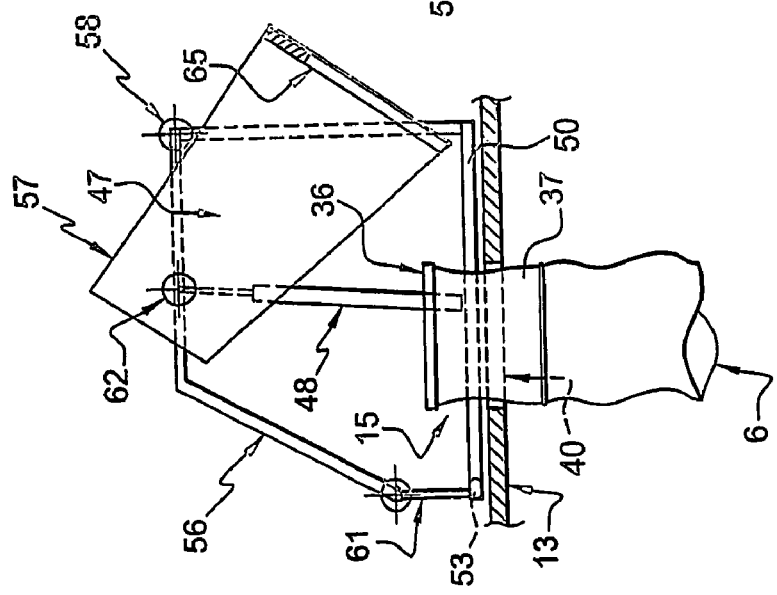

AIR FILTRATION UNITS OF THE TYPE COMPRISING FILTRATION BAGS

FIELD OF THE INVENTION

The present invention relates to an improvement made to air filtration plants fitted with filter sleeves. It also concerns an assembly process of a filter sleeve within the plant, as well as a tool for tensioning said sleeves suited to said plant.

BACKGROUND OF THE INVENTION

Plants of such type are described for example in the documents EP-0 343 061 and FR-2 514 669.

The corresponding apparatus ensure extraction of elements in suspension in a drawn atmosphere of particular premises, for example in production, treatment or storage facilities of powdery products, or of certain industries causing the release of waste such as very volatile sawings or chippings.

Such apparatus are formed conventionally of three main elements generally centred on the same vertical axis:

an upper body, cylindrical or truncated, wherein the air to be de-dusted arrives tangentially, a settling chamber, in the form of a funnel or cylindrical, arranged beneath the upper body; this chamber is fitted with waste recovery means at the lower section thereof, and a filter cartridge formed of vertical filter sleeves extending between said settling chamber and the cover of the apparatus where the filtered air is exhausted.

The corresponding filter sleeves are generally cylindrical in shape and they are made conventionally of a material such as needled felt. Such sleeves are stretched vertically within the filter cartridge between two adapted supporting structures: their lower ends are interconnected on a lower supporting structure, for example in the form of a grid, which is situated above the settling chamber, and which provides access to the contaminated air on the outer side of the filter sleeves; their upper ends are interconnected to an upper supporting structure, generally in the form of a plate fitted with circular openings, for exhausting the air filtered.

The assembly of each filter sleeve within this kind of plant is described for example in the document U.S. Pat. No. 4,244, 718. Such assembly consists first of all in interconnecting the upper end of the sleeves at one of the openings of the upper plate; such interconnection is obtained traditionally an integrated member in the form of a ductile ring (of <<snap ring>> type).

The lower end of the sleeves is then attached to the lower supporting structure; appropriate means are provided at this lower end for reliable tensioning of each sleeve.

By reason of the structure of the current filtration plants, the operator should be able to access the lower supporting structure to carry out most of the assembly and maintenance operations relative to the filter sleeves.

Still, the corresponding interventions are not really convenient because of the small space requirements encountered. Moreover, they are conducted in dusty and dirty environments; besides, they are not totally harmless to the operator further to the dusts in presence, in particular within the framework of items of equipment processing atmospheres with explosive or flammable characteristics.

SUMMARY OF THE INVENTION

The purpose of the present invention is to remedy these shortcomings while providing an air filtration plant whereof the original structure facilitates the assembly and maintenance operations for the out-call staff.

The air filtration plant, according to the invention, is of the type described above in that it includes a filter cartridge formed of filter sleeves stretched vertically; it is characterised in that the upper and lower fastening means of the filter sleeves are suited to enable adjustment of the tension of each sleeve at the upper end thereof.

The operator may consequently conduct most of the assembly and maintenance operations at the upper supporting structure of the sleeves, and this in a secured and little polluted atmosphere.

According to a particular provision of the invention, the fastening means of the upper end of the filter sleeves, at the upper supporting structure, consist of a add-on member in the form of a ductile ring; such add-on member is designed for a location within the sleeves once the latter have been attached to the lower supporting structure, and stretched, so as to hold said sleeves in this stretched condition by clamping against the contour of the openings of the upper supporting structure.

Preferably, the corresponding add-on ductile ring includes an annular groove extending over the external contour thereof, intended for being embedded on the internal contour of the openings of the upper supporting structure, so as to clamp the sleeves against these openings.

Preferably still, the upper end of the filter sleeves is fitted with a structural element for easier gripping thereof, manually or mechanically, in particular for a reliable tension thereof.

According to a particular embodiment, the corresponding structural element is in the form of a rigid collar integrated to the structure of the sleeve.

The filter sleeves may have a circular section constant over the whole length thereof; according to an embodiment variation, they may comprise an upper end portion generally truncated in shape, with an end rigid collar of diameter greater than that of the openings of the plateau.

This particularity enables the sleeves to run through the openings of the upper supporting structure more easily, from the cover of the apparatus, while avoiding any accidental fall of the whole sleeve into the filter cartridge.

According to another provision of the invention, the lower end of the filter sleeves is provided with a bottom cup, fitted with a protruding rod comprising a catching element; such catching element is designed for co-operating with a supporting profile of matching shape, provided at the lower supporting structure.

Preferably, the lower supporting structure includes at least one supporting profile, in the form of folded sheet metal, formed of a central part extending vertically, and whereof the upper end is extended by a return element extending over the whole length thereof. The corresponding return element is fitted with several open slots each letting through a rod for catching a sleeve and locating the catching element of said rod.

Preferably still, the upper end of the supporting profile(s) includes a return element formed of two parts forming a dihedron. One of said parts, designated <<horizontal section>>, extends at right angle or substantially at right angle from the upper end of the central part of the supporting profile; the other of said parts, designated <<tilted section>>, extends slantwise downwards. Such return element is fitted with a plurality of open slots each letting through a rod for catching a sleeve, the catching element of said rod being designed for a location beneath the horizontal section aforementioned.

The present invention also relates to a particular tensioning tool of filter sleeves, pour an air filtration plant as described above.

The corresponding tensioning tool includes:
- a seating element intended for being located on the upper supporting structure of the plant,
- a stretching means of the upper end of a filter sleeve, and
- a means for manoeuvring the traction means.

Preferably, the manoeuvring means in question assist mechanically the driving of the traction means.

The manoeuvring means then consists advantageously of at least one gas, pneumatic or hydraulic jack-operated device; this or these manoeuvring means are arranged between the seating element and the traction means, so as to enable assisted manoeuvring thereof when being deployed.

Still according to a particular embodiment, the stretching means consist of generally U-shaped element, intended for location beneath an element in the form of a collar provided at the upper end of the sleeves.

The purpose of the present invention is still a particular assembly process of a filter sleeve within the air filtration plant, subject matter of the invention. Such process consists mainly:
- in attaching the lower end of the filter sleeve, via an appropriate fastening means, to the lower supporting structure,
- in tensioning the filter sleeve by a vertical upward traction, and
- in attaching the upper end of the filter sleeve to the upper supporting structure via a suitable fastening means.

On the other hand, the invention also concerns a particular filter sleeve suitable to equip the air filtration plant described above, which sleeve includes a hooking member at its lower end, and a structural element for easier gripping thereof at its upper end. The structural element in question may be in the form of a rigid collar.

In a particular embodiment, the upper section of this filter sleeve is generally truncated in shape delineated by two rigid collars, the upper rigid collar having a diameter greater than that of the lower rigid collar.

BRIEF DESCRIPTION OF THE DRAWINGS

But the invention will still be illustrated, without being limited thereto, by the following description of a particular embodiment of an air filtration plant according to the invention, given solely for exemplification purposes, and illustrated by the appended drawings, wherein:

FIGS. 7A, 7B and 7C are schematic views which illustrate the tensioning tool illustrated on FIG. 6, according to the main arrangement for stretching a filter sleeve according to the invention.

DETAILED DESCRIPTION OF EMBODIMENTS

Figure 1:
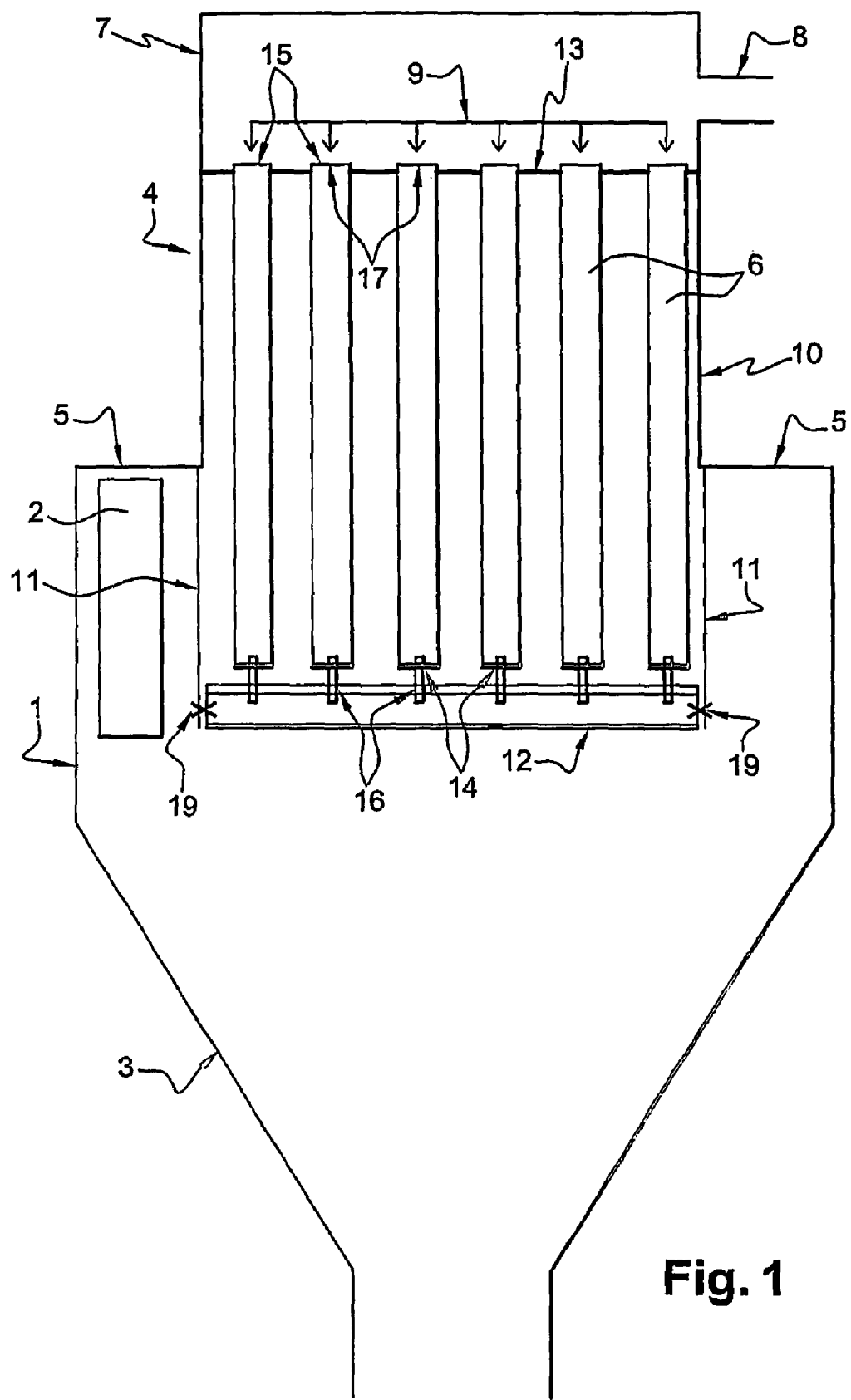
FIG. 1 is a schematic elevation view of an air filtration plant fitted with a filter sleeves, according to the invention.

The air filtration plant represented as a schematic elevation view on FIG. 1, includes elements of circular shape which are centred on the same vertical axis, i.e. mainly:
- an upper body 1, in the form of a cylindrical ferule, fitted with a tangential supply 2 of the air to be de-dusted;
- a settling chamber 3, here of truncated shape, arranged in the alignment and beneath the upper body 1; this chamber 3 includes in its lower section particle and/or dust recovery means, not represented, deposited thereon
- a filter cartridge 4, interconnected with the upper body 1 by means of a annular ring 5; this filter cartridge 4 includes a set of filter sleeves 6, for example made of a material such as needled felt, possibly fitted with several reinforcement rings arranged over the length thereof.

The corresponding filter cartridge 4 extends for example substantially half in the upper body 1, and the other half above this very corps 1. The upper section of the filter cartridge 4 includes a cover 7, fitted with an opening 8 for exhausting the filtered air; this cover 7 may be equipped with an automatic filter cleaning device 9, conventional, well known in the technical field affected.

This filter cartridge 4 is delineated laterally, above the upper body 1, by a cylindrical wall or shroud 10; it is delineated in its lower section, at the upper body 1, by a shroud 11 in the form of a skirt which is intended to form a screen for protecting the lower section of the sleeves 6 arranged at the tangential supply 2 of the air to be de-dusted.

The cartridge 4 is still delineated by two supporting structures, one lower 12 and the other upper 13, between which the filter sleeves 6 are held stretched vertically.

The lower supporting structure 12 is in the general form of a grid; it is situated above the settling chamber 3 and it is held in position by attachments 19 interconnected with the lower section of the skirt 11. The upper supporting structure 13 is, for its own part, in the form of a plate fitted with a plurality of circular openings; it is arranged at the upper section of the cylindrical shroud 10, attached conveniently.

The lower 14 and upper 15 ends of the filter sleeves 6, are interconnected respectively with the supporting structures 12 and 13 by fastening means marked 16 and 17.

According to the invention, such fastening means 16 and 17 are suited to enable tensioning of the sleeves 6 at the upper ends thereof 15.

The fastening and tensioning means aforementioned enable particular cinematic assembly of the filter sleeves 6 within the filter cartridge 4. Indeed, each of the sleeves 6 may be mounted in the plant according to the following procedure:
- first of all, the lower end 14 of the sleeve 6 is interconnected with the lower supporting structure 12 by dint of the associated fastening means 16;
- this sleeve 6 is then tensioned by a vertical upward traction exerted on its upper end 15;
- the sleeve 6 held stretched is finally interconnected with one of the openings of the plate 13 by actuating the associated fastening means 17.

For disassembly of the sleeves 6, the operator should simply deactivate successively the fastening means 16 and 17, in an order appropriate to the situation.

The fastening means 16, for interconnection of the lower end 14 of the sleeves 6, are adapted for being activated by an operator located at the upper supporting structure 13; and tensioning of the sleeves may also be realised at the upper supporting structure 13.

Consequently, the out-call staff may then conduct all the maintenance operations, and notably the assembly/disassembly operations of the sleeves 6, from said upper supporting structure 13, and this in a clean environment or at least a little polluted environment.

Obviously, the operator may access such upper plate 13 by any appropriate means. Such access may in particular consist of a manhole, a pivoting vaulted cover or similar, for example provided in the upper cover 7.

A particular embodiment of the fastening and tensioning means of the filter sleeves 6 is represented on FIGS. 2 to 7.

Figure 2:
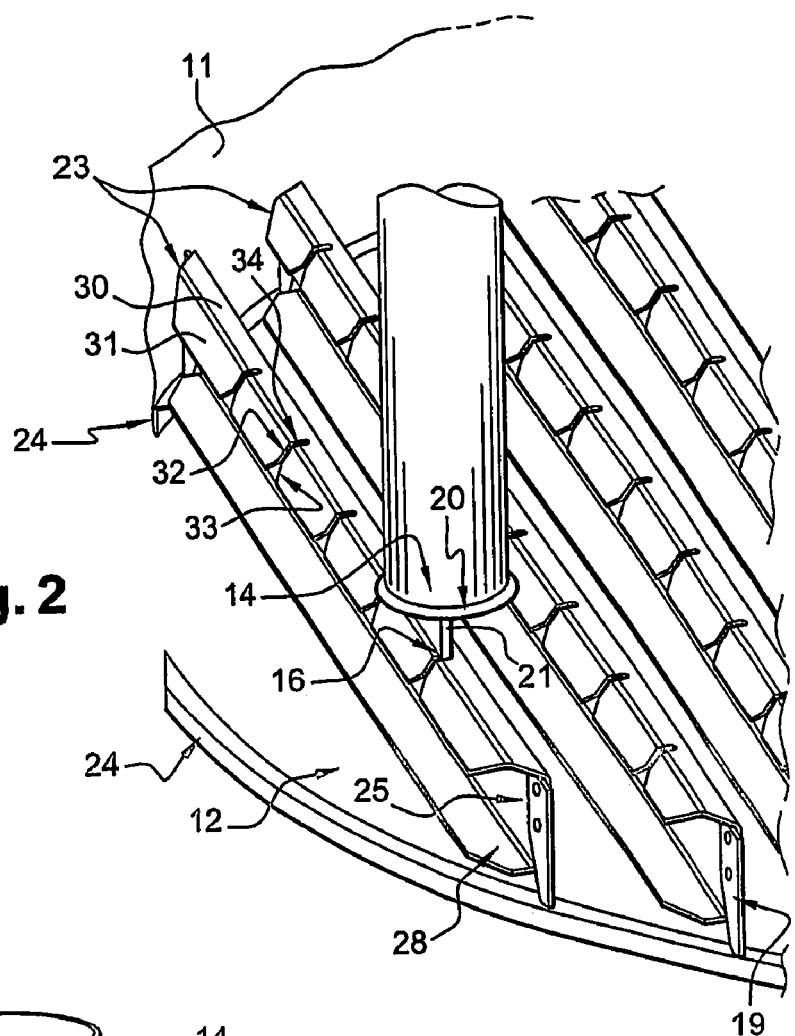
FIG. 2 is a perspective view of a section of the plant of FIG. 1, detailing the fastening means of the lower end of a filter sleeve to the lower supporting structure.
Figure 3:
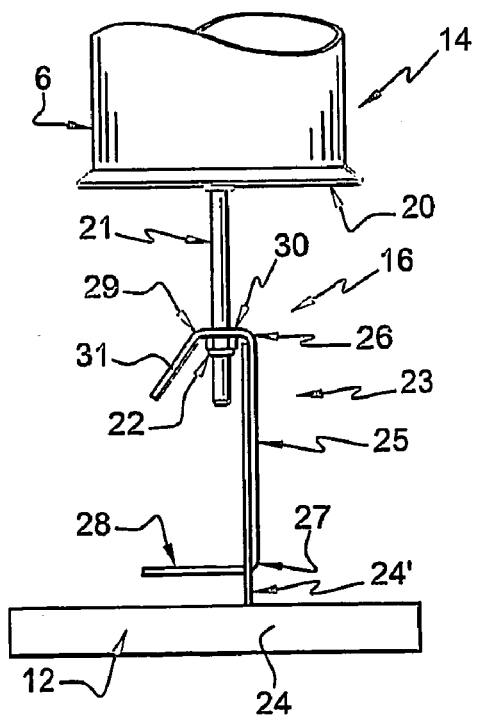
FIG. 3 is a side view still detailing the fastening means of the lower end of a filter sleeve to the lower supporting structure.

The fastening means 16 of the lower end 14 of the sleeves to the structure lower 12 are detailed on FIGS. 2 and 3; they are implemented after running the sleeve 6 into one of the openings of the upper plate 13.

First of all, it should be noted on FIGS. 2 and 3 that the lower end 14 of the sleeve 6 is provided with a bottom cup 20, conventional, fitted with a central rod 21 extending axially, and comprising at its end a catching element 22; such catching element 22 consists here of an element of nut-brake type, screwed on a thread provided on the end of the rod 21. More generally, any type of particular hooking system, such as a single-block hook, a snap-on structure, magnet or other, arranged at the end of the rod 21 may be contemplated.

As can be noted on FIGS. 2 and 3, the lower supporting structure 12 is constituted of a plurality of parallel profiles 23, attached to reinforcement 24 arranged at the lower end of the skirt 11; the attachment in question is realised by means of the linking plates 19.

The supporting profiles 23 are made of folded sheet metal they are each constituted of a vertical central part 25 delineated by an upper end rim 26 and a lower end rim 27. The lower end rim 27 is extended over its whole length by a return element 28 at right angle, for increased rigidity of the profile.

The upper end rim 26 is, for its own part, fitted with an upper return element 29, in the form of a dihedron, formed of two sections marked 30 and 31. The section 30 extends at right angle from the end 26 of the central part 25, along a horizontal or substantially horizontal plane; the section 31 of the return element 29 extends the section 30 tilted downwards aforementioned.

As may be observed on FIG. 2, the return element 29 exhibits several open slots 32, extending transversally over both sections 30 and 31 of said upper return element 29. The end 33 of each slot 32 is generally V-shaped at the opening; the other end 34 only extends partially over the horizontal section 30 of the return element 29.

The catching element 22 of the sleeves 6 is designed for co-operating with one of the slots 32 provided on the supporting profiles 23.

When assembling a sleeve 6 on the supporting profile 23, the rod 21 is located at the flared end 33 of the slot 32 affected, the catching element 22 being arranged beneath the end of the section 31 of the return 29; the V-shape of this end 33 facilitates the insertion of the rod 21 into the slot 32.

It then suffices for the operator to exert an upward traction to the sleeve 6 for final positioning, as may be observed in detail on FIG. 3. Indeed, the tilted shape of the section 31 of the return element 29 enables the catching element 22 to travel up to a position against the lower face of the horizontal section 30. Moreover, this tilted section 31 of the upper return element 29 forms a kind of stop, intended for holding in position the catching element 22 against the horizontal section 30, when the sleeve 6 is held stretched; this tilted section 31 also enables to prevent disconnection of the catching element 22 in case of slight release of the sleeve 6.

To deactivate the attachment of the lower end 14 to the lower supporting structure 12, the operator simply needs to suppress the tension exerted upon the sleeve 6 and to disengage the rod 21 from the open slot 32.

As indicated above, the corresponding hooking operation may be realised from the upper zone of the cartridge 4, at the cover 7. To do so, the operator holds the upper end 15 of the sleeve 6 and initiates slight oscillation of this sleeve so as to locate the catching element 22 into one des slots 32. It should be understood that the attachment of the lower end of the sleeves 6 to the lower supporting structure 12 takes place quite simply and without requiring any particular tooling.

Once the lower end of the sleeve 6 has been attached, the assembly of said sleeve 6 continues with the tensioning thereof and with the attachment of its upper end 15 to the plate fitted with openings 13. The corresponding fastening means 17 are detailed on FIGS. 4A to 4C.

First of all, on these FIGS. 4A to 4C, it should be noted that the upper end 15 of the sleeve 6 is fitted with two rigid collars, one lower 35 and the other upper 36, delineating a cylindrical upper end portion 37, at which the fastening means 17 are intended for location; these rigid collars 35 and 36 are in the form of rings of plastic or metallic material integrated to the structure of the sleeve 6, for example in sewn sheaths.

The fastening means 17 are in the form of a add-on ductile ring 38, of <<snap ring>> tube, whereof the external contour is fitted with an annular groove 39; such member 38 is intended for clamping and holding the upper end portion 37 of sleeve 6 on the plate fitted with openings 13, as will be described more in detail below.

After locating the upper end 15 of the sleeve 6 in the affected opening 40 of the plate 13 (FIG. 4B), said sleeve 6 is stretched by an upward traction; the assembly is finalised by locating the annular member 38 within the sleeve 6 stretched, as illustrated on FIG. 4C.

To do so, the annular flexible member 38 inside the upper end portion 37 of the sleeve 6, so that the annular groove 39 is placed on the contour 41 of the orifice 40; a circular zone of the upper end portion 37 of the sleeve 6 is then clamped or pinched between said ductile member 38 and the contour 41 of the orifice 40 of the plate 13. The flexibility characteristics of the annular member 38 are adapted for optimum clamping and holding of the upper end of the sleeve 6 stretched.

This type of interconnection ensures efficient tightness between the sleeve 6 and the plate fitted with openings 13 this still prevents the risks of rotation of the sleeve 6. Moreover, the close contact between the sleeve 6 and the plate fitted with openings 13 ensures efficient electrostatic conductibility, enabling to reduce the risks of electrostatic discharge without requiring the use of conductibility beads.

Figure 4:
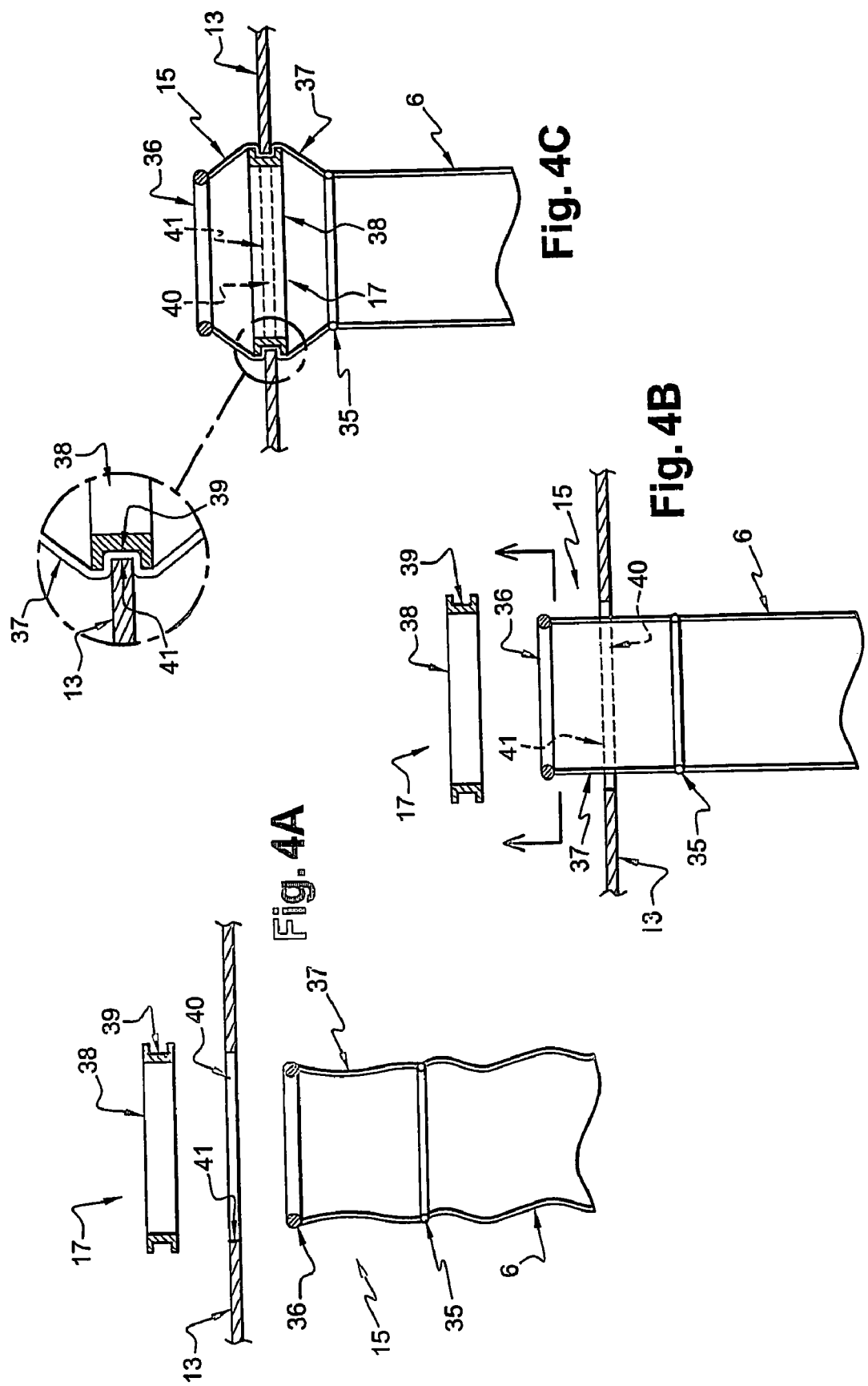
FIGS. 4A, 4B and 4C illustrate schematically the main steps for interconnecting the upper end of a sleeve to the upper supporting structure.

It appears from this description, in relation to FIGS. 2 to 4, that the assembly and the disassembly of the filter sleeves 6, within the cartridge, may take place quickly and simply from the upper cover 7.

More generally, the fastening means 16 and 17 of the sleeves 6 are suited to enable tensioning of said sleeves by acting solely upon their upper end 15, without acting upon their lower end 14, contrary to the plants of this kind know to the state of the art.

Figure 5:
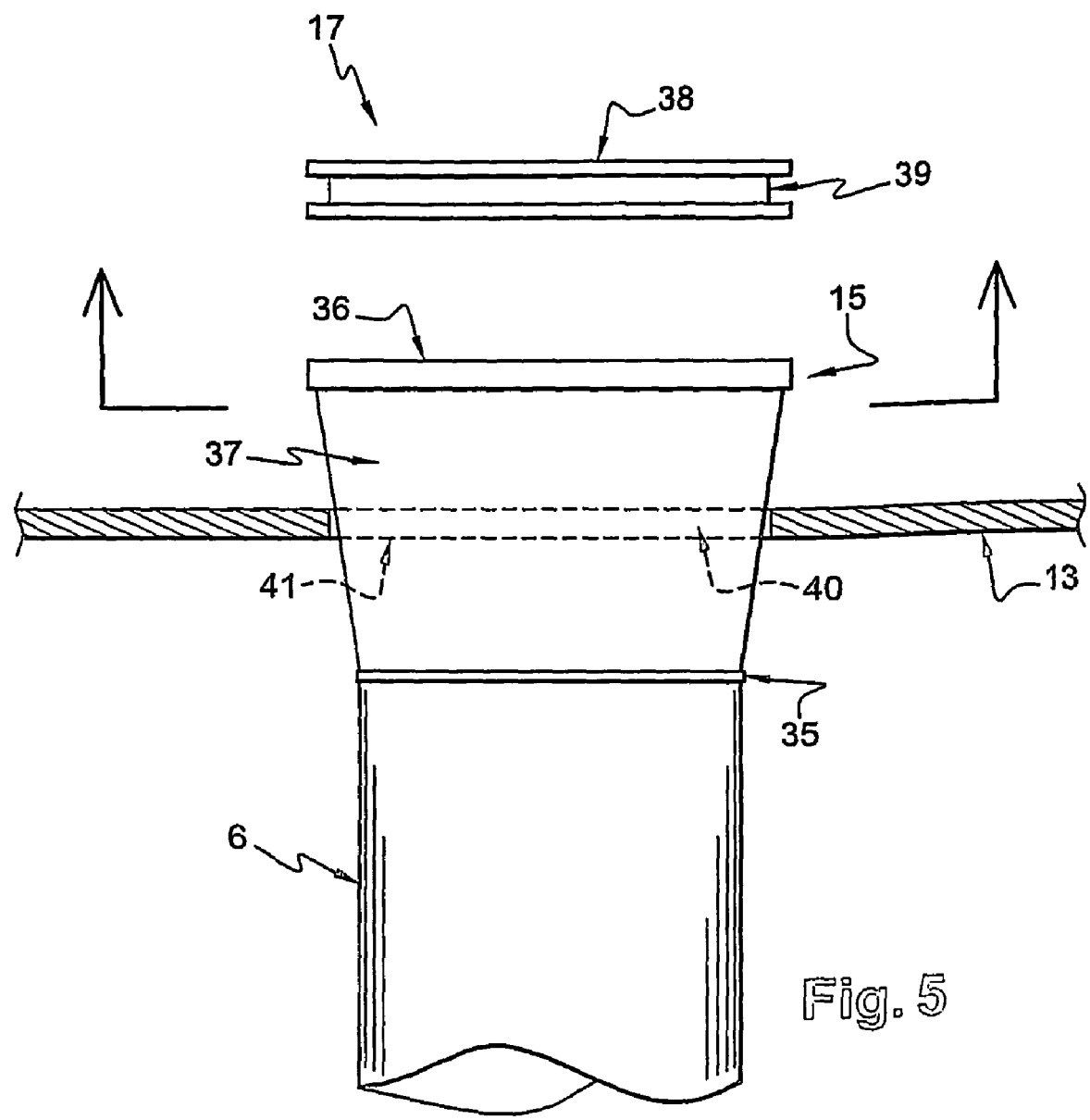
FIG. 5 is a side view showing an embodiment variation of the filter sleeves.

According to a derived embodiment, illustrated on FIG. 5, the filter sleeve 6 may include an upper end portion 37, arranged between the rigid collars 35 and 36, generally truncated in shape. In this case, the upper rigid collar 36 has a greater diameter than that of the lower rigid collar 35, but also in relation to the diameter of the openings 40 of the upper supporting structure 13; the remainder of the length of these sleeves, in the alignment of the lower rigid collar 35, is cylindrical, of diameter smaller than or equal to that of the openings 40 aforementioned.

The assembly of such a sleeve within the plant involves running the lower end thereof through an opening 40 of the upper supporting structure 13, and this from the upper cover 7.

After fastening its lower end 14 to the supporting structure 12, the sleeve 6 is stretched and fastened at its upper end portion 37 to the upper supporting structure 13. It appears that by reason of the particular diameter of the upper rigid collar 36, the operator conducting the assembly or the disassembly of these sleeves cannot drop them by accident, in particular in the lower section of the filter cartridge 4.

The tensioning of the upper section of the filter sleeves 6 may take place manually or assisted by an appropriate tooling.

Figure 6:
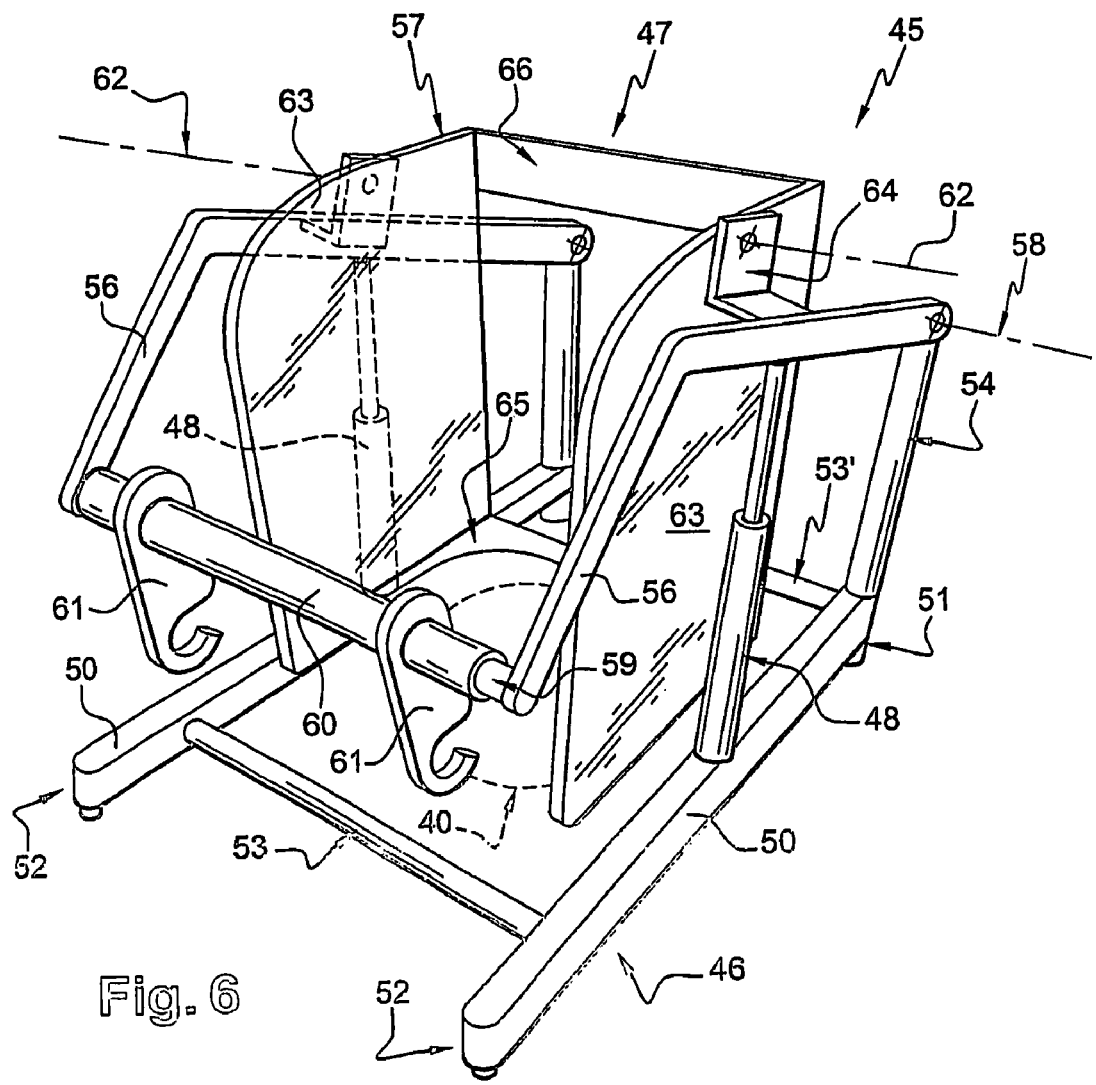
FIG. 6 is a perspective view of a tool suitable for tensioning the filter sleeves.

A particular embodiment of a mechanical tensioning means of the sleeves is represented on FIGS. 6 and 7.

The corresponding tensioning tool 45 (FIG. 6) is constituted of the following main elements:

a seating 46, intended to rest on the plate fitted with openings 13, a traction structure 47, adapted for co-operating with the upper end 15 of a sleeve 6, and a manoeuvring system 48, intended for assisting the displacement of the traction structure 47.

The seating 46 includes two longitudinal girders 50 extending parallel to one another, and whereof the ends 51 and 52 are connected by crosspieces 53, 53'. The ends 51 of each of the longitudinal girders 50 are fitted each with a vertical stanchion 54, on which the traction structure 47 is hinged.

This traction structure 47 is here constituted of a set of two arms 56, supporting a gripping member 57 of the sleeve 6. One of the ends of these arms 56 is hinged along a horizontal axis 58 on the vertical stanchions 54; the other end of these arms 56 is connected by a crosspiece 59 whereon an element in the form of a sleeve 60 fitted with two hooking structures 61 is hinged; both these hooks 61 are arranged so as to co-operate with the crosspiece 53 provided on the side of the end 52 of the longitudinal girders 50.

The gripping member 57 is hinged on the arms 56, along an axis 62 parallel to the pivoting axis 58 aforementioned. Such gripping member 57 is formed of two lateral walls 63, co-operating with the arms 56 by lugs 64, connected by a generally U-shaped floor 65; moreover, a crosspiece 66 is provided between the lateral walls 63 for increased global rigidity.

FIG. 6 also shows the manoeuvring system 48 of the traction structure 47, here illustrated in the form of two gas-operated springs; these gas-operated springs 48 extend each from a longitudinal girder 50 of the seating element 46 to the manoeuvring arm 56 arranged opposite.

FIGS. 7A to 7C illustrate the use of the tool 45 for tensioning a sleeve 6.

As can be noted on FIG. 7A, the tensioning tool 45 is first of all located at an opening 40 of the upper supporting structure 13; more precisely, the longitudinal girders 50 of the seating 46 are located on both sides of the corresponding opening 40.

The hooks 61 co-operate with the crosspiece 53, situated on the end 52 side of the longitudinal girders 50; the gas-operated springs 48 of the manoeuvring system are then in a retracted position.

Moreover, the gripping member 57 is toggled around its axis 62, in order to release the central space and facilitate the passage of the upper end 15 of the sleeve 6 through the opening assembly 40.

Once the end 15 of the sleeve 6 has been sufficiently stretched upward manually, the gripping member 57 is pivoted so as to adopt a resting position, i.e. with the floor element 65 horizontally (FIG. 7B).

When the gripping member 57 pivots round the axis 62, the U-shaped floor element 65 is located just beneath the lower face of the collar 36.

The sleeve 6 is then stretched by manual deactivation of the hooks 61 (FIG. 7C). Indeed, the gas-operated springs 48 impart a thrust and they can deploy automatically; this cause the arms 56 to be hinged around their axis 58, and consequently vertical or substantially vertical displacement upwards of the gripping member 57.

The upper collar 36 is then stretched upwards, over a few millimeters or a few centimeters, in order to stretch the sleeve 6 correctly.

The gas-operated springs 48 hold the corresponding tension without involving the operator's intervention; the latter may then locate the ductile ring 38 so as to clamp the upper portion 37 of the sleeve 6 against the contour 41 of the opening 40, as described previously in relation to FIG. 4C.

To separate the tool 45 from the sleeve 6, the operator actuates downwards the sleeve 60, so as to re-actuate the hooks 61; he may then cause the gripping member 57 to pivot easily and thereby to clear the upper collar 36. The tool 45 may then be displaced at another opening 40 to stretch another sleeve.

This tool 45 enables to assist the operator in tensioning the sleeves 6; once such a tool has been located correctly, the operator should also deactivate the hooks 61, and the gas-operated springs 48 stretch the sleeve automatically. When this sleeve 6 is stretched, the operator may concentrate on the location of the lock ring 38 without adjusting the tension of the sleeve.

The strength of the gas-operated springs 48 will be adapted to provide each of the sleeves with regular and constant tension, for example of the order of 40 kg.

It will be noted that the filter sleeves of the plant may have sections others than circular ones, for example oval or polygonal; the form of the openings 40 of the upper plate 13 will then be adapted consequently.

The invention claimed is:

1. An air filtration plant, comprising:
a filter cartridge fitted with filter sleeves, said sleeves are arranged vertically, and held stretched by appropriate stretching means between two supporting structures, a closed lower end of said sleeves being attached to a lower one of said two supporting structures by a first fastener, and an open upper end of said sleeves being attached to openings provided in an upper supporting structure of said two supporting structures, by a second fastener, said upper supporting structure being in the form of a plate fitted with said openings, wherein the upper end of the sleeves is fitted with a structural element that increases the grip thereof, manually or mechanically, wherein the stretching means fasten the filter sleeves and are configured to enable tensioning of said sleeves at the upper ends thereof, and wherein said second fastener comprises a separate add-on member that is configured to be located within said sleeves below said upper end when the sleeves have been attached to the lower supporting structure and have been stretched to a stretched position, said add-on member being configured to hold said sleeves in said stretched position by clamping against an internal contour of the openings of the upper supporting structure.

2. The plant according to claim 1, wherein the add-on member is in the form of a ductile ring.

3. The plant according to claim 2, wherein the ductile ring includes an annular groove, provided on the external contour thereof, configured for being embedded on the internal contour of the openings of the upper supporting structure.

4. The plant according to claim 1, wherein the upper end of the filter sleeves is fitted with said structural element in the form of a rigid collar for easier gripping to provide a reliable tension thereof.

5. The plant according to claim 4, wherein a portion of the upper end of the filter sleeves is delimited by two rigid collars having a frustum shape, a diameter of the rigid collar at the upper end of the sleeves is greater than a diameter of the openings of the plate.

6. The plant according to claim 1, wherein the lower end of the filter sleeves is provided with a bottom cup fitted with a protruding rod comprising a catching element, said catching element is configured for co-operating with a supporting profile) of matching shape, provided at the lower supporting structure.

7. The plant according to claim 6, wherein the lower supporting structure is fitted with at least one supporting profile, in the form of folded sheet metal, formed of a central part extending vertically, and an upper end of said central part is extended by a return element, extending over a whole length thereof, said return element is fitted with several open slots each configured to receive there through said rod for catching a sleeve and locating the catching element of said rod.

8. The plant according to claim 7, wherein the lower supporting structure is fitted with said at least one supporting profile, comprising said return element formed of two parts forming a dihedron, one of said parts extending at right angle or substantially at right angle from the upper end of the central part, and the other of said parts being tilted downwards, said catching element being configured beneath said horizontal part.

9. An air filtration plant, comprising:
a filter cartridge having a plurality of vertically arranged filter sleeves, said filter sleeves being held in a stretched position between two supporting structures, a closed lower end of said filter sleeves being attached to a lower one of said two supporting structures by a first fastener, and an open upper end of said filter sleeves being attached to openings provided in an upper supporting structure of said two supporting structures, by a second fastener, said upper supporting structure being a plate having said openings, wherein an uppermost end of the sleeves is fitted with a grip increasing element, and wherein said second fastener comprises a separate add-on member that is configured to be within said sleeves, below said uppermost end, when the sleeves have been attached to the lower supporting structure and have been stretched to said stretched position, said add-on member being configured to hold said sleeves in said stretched position by clamping against an internal contour of the openings of the upper supporting structure.

* * * * *